Nov. 6, 1928.
H. FORST
1,690,673
CAMERA
Filed March 12, 1927
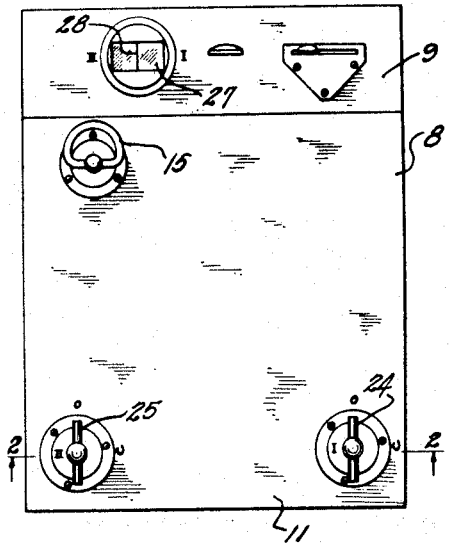
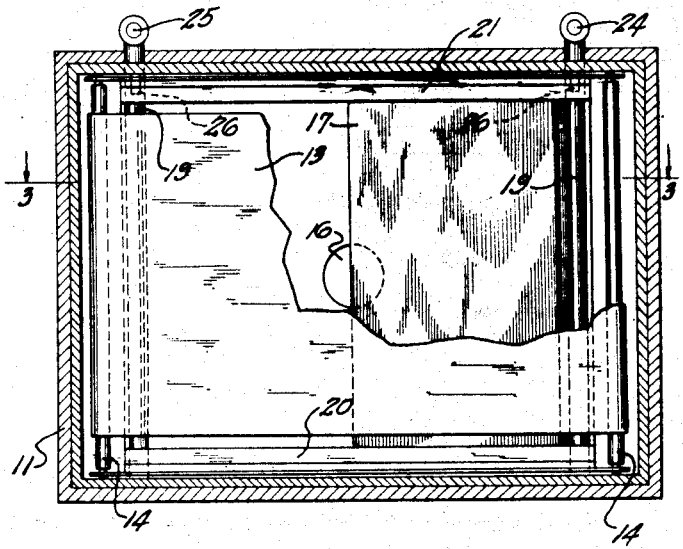
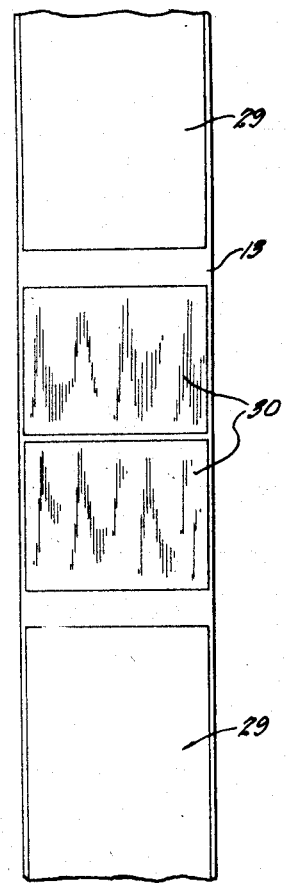
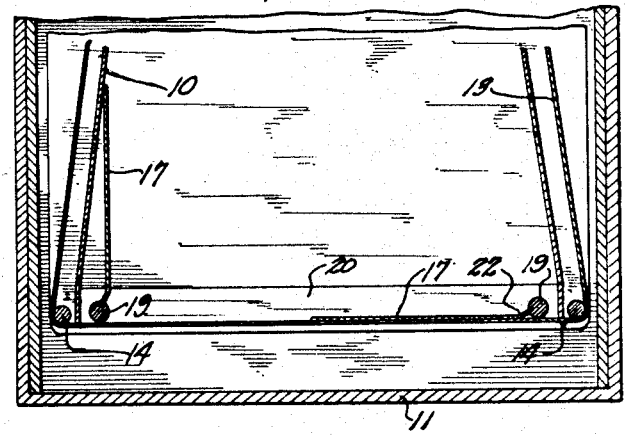
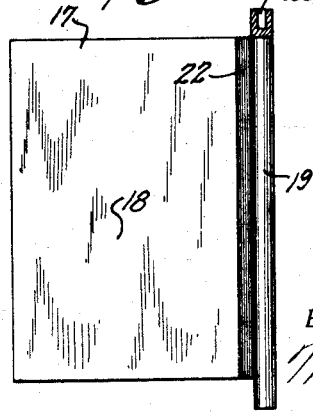
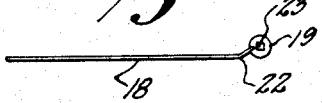
INVENTOR.
Hattie Forst.
BY
Morsell, Keeney + Morsell,
ATTORNEYS.

Patented Nov. 6, 1928.

1,690,673

UNITED STATES PATENT OFFICE.

HATTIE FORST, OF MILWAUKEE, WISCONSIN.

CAMERA.

Application filed March 12, 1927. Serial No. 174,926.

This invention relates to improvements in cameras.

In cameras for amateur use pictures are taken upon an elongated film adapted to be rolled from one side of the camera frame to the other rearwardly of and in line with the lens and each exposure is made upon that portion of the film which is stretched rearwardly of the lens. Consequently each film will permit of only a limited number of exposures and the area of the film required for each exposure is fixed.

With the arrangement described it often happens that all of the exposures on a film, save for instance one, are exhausted, and the photographer desires to take several more pictures, and this is not possible unless another complete film roll is available.

It is therefore, the primary object of the present invention to provide a camera in which the exposure areas of the film may be divided so that on a film surface where only one picture formerly could be taken, two pictures, each half the normal size, may now be taken.

A further object of the invention is to provide a camera equipped with a pair of film shutters which are adjustable to permit each exposure area on a film roll being used for one full sized picture or two half size pictures.

A further object of the invention is to provide a film shutter arrangement for cameras with which any of the cameras now on the market may be readily equipped.

A further object of the invention is the provision of a camera with film shutters to vary the size and number of possible exposures which are very simply and easily adjusted and operated.

A further object of the invention is to provide a camera which is of very simple construction, is strong and durable, is inexpensive to manufacture, is efficient in operation, and is well adapted for the purposes set forth.

With the above and other objects in view the invention consists of the improved camera and its parts and combinations as set forth in the claims, and all equivalents thereof.

In the accompanying drawing in which the same reference characters indicate the same parts in all of the views:

Fig. 1 is a plan view of the improved camera;

Fig. 2 is a cross-sectional view taken on line 2—2 of Fig. 1 and on a larger scale;

Fig. 3 is a sectional view taken on line 3—3 of Fig. 2;

Fig. 4 is a detail view of one of the film shutters;

Fig. 5 is a top view thereof; and

Fig. 6 is a fragmentary view of an exposed film roll showing how the exposure areas are divided by means of the film shutters.

Referring now more particularly to the drawing it will appear that the numeral 8 indicates a camera of ordinary construction in general and having a front section 9 provided with an integral rear inner shell 10. The rear inner shell is normally closed by a rear cover or section 11 which meets the front section along the line 12.

A film 13 is extended from a spool within the camera at the forward portion rearwardly across the open rear end portion of the shell 10, over end rollers 14, and then forwardly along the opposite inner side of the camera to an oppositely disposed spool and the film is advanced from one spool to the other to bring the exposure areas adjacent the open end of the shell, by turning a key 15 connected with one of the spools. The normal size of each picture or exposure on the film is that portion of the film which extends across the open rear end of the shell and the sensitized surface thereof is exposed by light admitted through the lens 16 in the front end portion of the camera.

The invention contemplates particularly the provision of means for independently shutting off each half of the film area across the rear of the shell and to be next exposed, for the purpose of obtaining two different adjacent exposures on said film area or pictures of a smaller size than ordinarily. To this end, a pair of film shutters 17 are provided, each shutter comprising a thin rectangular sheet of metal 18 having darkened surfaces and having one side edge thereof secured in a pivot post 19. The pivot posts 19 of said shutters are vertically pivotally mounted in opposed rear end portions of the shell 10 and in upper and lower flanges 20 and 21. When in open position each shutter will assume a longitudinal position adjacent the side of the shell 10 as shown at the left in Fig. 3. In closed position each shutter will lie against a portion of the sensitized surface of the film, as shown at the right in Figs. 2 and 3, and each shutter plate adjacent its post, is off-set, as at 22, to insure a flat contact with the film. The upper end of each shutter post is formed with a squared aperture 23 and a pair of removable keys 24 and 25 are extended through opposite rear portions of the section 11 and shell and the lower ends of the keys are squared, as at 26, to enter the post openings 23. Thus, each shutter may be turned to open or closed position by means of its key and the top of the camera, adjacent each key 24 and 25 has designations "O" and "C" to indicate open and closed positions of the respective shutters.

The finding or sighting glass 27 of the camera is divided medially by a line 28 so that objects may be found and positioned in either half of the glass for an exposure on either half of the film area.

In use, the camera may be operated in the usual way taking the full size pictures as indicated at 29 in the film in Fig. 6. However, if it is desired to take two adjacent exposures on one film surface, first one shutter will be closed as shown in Figs. 2 and 3 and the exposure taken on the uncovered side of the film portion. Then, said exposed side is covered by its shutter and the shutter controlling the other side is opened and the next exposure is taken on this side of the film. The result is that two adjacent exposures are on the portion of a film usually required for one larger picture, as indicated at 30 in Fig. 6.

From the foregoing description it will be seen that the improved camera is of very simple and novel construction, and is well adapted for the purpose set forth.

What I claim as my invention is:

1. In a multiple exposure camera, a pair of shafts revolubly mounted within the rear portion of the camera adjacent the film exposure area, and a thin, flat, rectangular, non-yieldable shutter carried by each shaft, the portion of each shutter adjacent its shaft being slightly offset to permit a flat disposition of the major portion of the shutter.

2. In a multiple exposure box camera, a pair of shafts revolubly and removably mounted within the rear portion of the camera adjacent the film exposure area, and a thin, flat, rectangular, non-yieldable metallic shutter carried by each shaft, the portion of each shutter adjacent its shaft being slightly offset to permit a flat disposition of the major portion of the shutter, said shutters in closed position being non-overlapping.

In testimony whereof, I affix my signature.

HATTIE FORST.